Nov. 19, 1968 D. W. BIRMINGHAM 3,411,397

PLASTIC FASTENER WITH ROTATABLY RELEASABLE EXPANDER

Filed March 6, 1967

United States Patent Office 3,411,397
Patented Nov. 19, 1968

3,411,397
PLASTIC FASTENER WITH ROTATABLY RELEASABLE EXPANDER
Douglas William Birmingham, Ickenham, England, assignor to United-Carr Incorporated, Boston, Mass., a corporation of Delaware
Filed Mar. 6, 1967, Ser. No. 620,763
Claims priority, application Great Britain, Mar. 7, 1966, 9,916/66
2 Claims. (Cl. 85—72)

ABSTRACT OF THE DISCLOSURE

A rivet comprising a head, a hollow shank and an expander pin which projects from the head and which is struck down through the head to expand the shank. The shank is internally tapered towards its tip and is divided, by an axial slot into two resilient tongues. The pin is elongate in transverse cross-section and provided with means for facilitating its rotation relative to the head. Initially the pin is attached to the head with its major transverse axis perpendicular to the major transverse axis of the slot and when struck down through the head the pin forces the tongues radially outwardly. In order to release the rivet the pin is rotated through 90° to align the major transverse axes of the pin and the slot thereby allowing the tongues to return to their original unstressed position.

---

The present invention relates to an improved rivet and in particular to a rivet which is readily removable and reusable while providing a firm connection when in place.

It is an object of the present invention to provide a rivet which is cheap and economical to manufacture, easy to install and provides a secure connection and which, in addition is readily removable and reusable.

According to the invention there is provided a rivet, which is releasable for reuse, the rivet comprising a head having a cylindrical through bore, a hollow shank extending from the undersurface of the head and having a tip remote from the head and a through passage co-axial with the bore in the head, a portion of the passage adjacent the head being cylindrical and of the same diameter as the bore in the head, the remaining portion of the passage being tapared towards the tip and at least that portion of the shank which is internally tapered being divided by a slot into two resilient tongues, and a pin which is elongate in transverse cross-section, is initially attached to the head so as to project from the upper surface of the head generally co-axially with the bore in the head and with its major transverse axis arranged across the slot and which is provided with means, at its end remote from the head, for facilitating rotation of the pin relative to the head, whereby the pin on being struck down through the bore in the head will enter the tapered portion of the passage in the shank and force the tongues radially outwardly, the pin being releasable therefrom by rotation through 90° to align the pin with the slot in the shank thereby allowing the tongues to return radially inwardly.

Preferred forms of the invention are described below with reference to the accompanying drawings in which.

Figure 1:
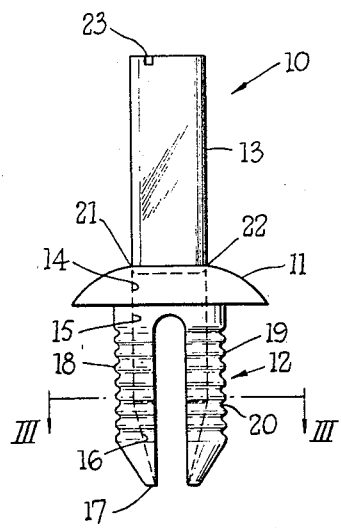
FIGURE 1 is an elevation of a rivet according to the invention.
Figure 2:
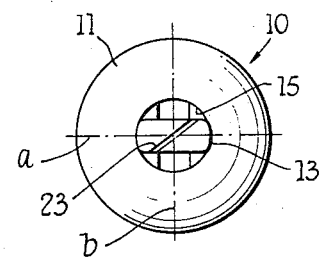
FIGURE 2 is a plan view of the rivet of FIGURE 1.
Figure 3:
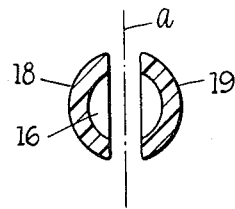
FIGURE 3 is a section on the line III—III of FIGURE 1.

In FIGURES 1 and 2 a rivet is indicated generally at 10. The rivet 10 is preferably formed from a synthetic plastics material, by injection moulding, and comprises a head 11, a hollow shank 12 and an expander pin 13.

The head 11 is circular and is formed with a cylindrical through bore 14.

The shank 12 extends from the undersurface of the head 11 and is formed with a through passage which is co-axial with the bore in the head and which comprises a cylindrical portion 15 adjacent the head and of the same diameter as the bore 14 in the head, and a tapered portion 16 which extends from the cylindrical portion 15 to the tip 17 of the shank. The shank 12 is divided by a slot extending from the tip 17 over a major part of its length, into two resilient tongues 18 and 19 and is formed with a series of external circumferential grooves 20.

The pin 13 is initially joined to the head 11, at 21 and 22, by two easily frangible webs of material, so as to project upwardly from the head generally coaxially with the bore 14. The pin 13 is elongate in transverse cross-section and is attached to the head with its major transverse axis $a$ arranged perpendicularly to the major transverse axis $b$ of the slot in the shank. The upper surface of the pin 13 is provided with means for facilitating rotation of the pin relative to the head 11, in the form of a slot 23 for the reception of a screw driver or similar tool. The slot 23 is inclined to the major and minor transverse axis of the pin to provide maximum resistance to shear under torque.

Figure 4:
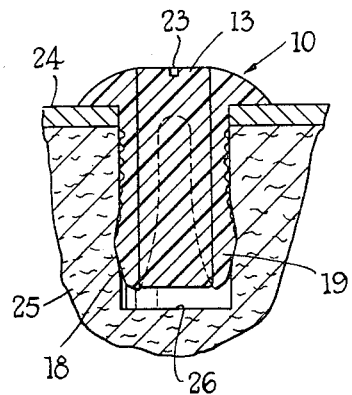
FIGURE 4 is an elevation, in section, of a panel held to an apertured support structure by the rivet of FIGURES 1 and 2.

The rivet 10 is used, as shown in FIGURE 4, to attach an apertured panel 24 to a support structure 25 formed with a bore 26. The panel 24 is placed against the structure 25 with the aperture in the panel overlying the bore 26 and the shank 12 of the rivet is then passed down through the panel and into the bore 26 to locate the panel between the head 11 of the rivet and the upper surface of the structure 25. The pin 13 is then struck down through the bore 14 and into the tapered portion 16 of the passage through the shank. As the pin 13 enters the tapered portion 16, since the major transverse axis of the pin is perpendicular to the major transverse axis of the slot in the shank, the tongues 18 and 19 are forced outwardly into tight frictional engagement with the wall of the bore 26 thus clamping the panel 24 to the support structure 25. If the material of the support structure is relatively soft, for instance if it is a fibre board, the material will be displaced into the grooves 20 on the shank thereby increasing the grip of the rivet on the support structure.

If it becomes necessary at any time to remove the panel 24 from the support structure this can be done quickly and easily by applying a screw driver to the slot 23 in the pin, rotating the pin through 90° so that the major transverse axis of the pin is aligned with the major transverse axis of the slot in the shank, thereby allowing the tongues 18 and 19 to move radially inwardly, and drawing the panel 24 and rivet 10 away from the support structure. Preferably, the minor transverse axis of the pin 13 is slightly less than the minor transverse axis of the slot in the shank to facilitate removal of the rivet from the support structure. After the rivet has been withdrawn, it can be reused by holding the pin in place prior to forcing it down into the shank.

Figure 5:
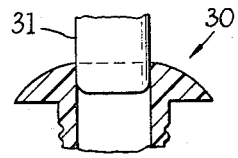
FIGURE 5 is an elevation, partly in section, through a part of a modification of the rivet of FIGURES 1 and 2.

In FIGURE 5 a modification of the rivet 10 is indicated generally at 30. The rivet 30 is similar to the rivet 10 except that it has a pin 31 the major transverse dimension of which is slightly greater than the diameter of the bore in the head and which is a friction fit therein. The pin 31 is thus separate from the remainder of the rivet but for handling and installation purposes the rivet 30 is a single unit and is used in the same manner as the rivet 10.

What I claim is:

1. A one-piece, synthetic plastic rivet, which is releasable for re-use, the rivet comprising a head having a cylindrical through bore, a hollow shank extending from the undersurface of the head and having a tip remote from the head and a through passage co-axial with the bore in the head, a portion of the passage adjacent the head being cylindrical and of the same diameter as the bore in the head, the remaining portion of the passage being tapered towards the tip and at least that portion of the shank which is internally tapered being divided by a slot into two resilient tongues, and a pin which is elongate in transverse cross-section and of uniform major transverse dimention throughout its length, the pin being initially attached to the head by an easily frangible web of plastic material so as to project from the upper surface of the head generally coaxially with the bore in the head and with its transverse axis arranged across the slot and being provided with means, at its end remote from the head, for facilitating rotation of the pin relative to the head, whereby the pin on being struck down through the bore in the head will enter the tapered portion of the passage in the shank and force the tongues radially outwardly, the pin being releasable therefrom by rotation through 90° to align the pin with the slot in the shank thereby allowing the tongues to return radially inwardly.

2. A rivet as claimed in claim 1, in which the major transverse dimension of the pin is approximately equal to the diameter of the bore in the head.

References Cited

UNITED STATES PATETNS

| | | | |
|---|---|---|---|
| 2,552,066 | 5/1951 | Sorensen | 24—217 |
| 2,745,620 | 5/1956 | Murphy | 24—217 |
| 2,997,910 | 8/1961 | Tinnerman | 85—72 |
| 3,203,304 | 8/1965 | Rapata | 85—84 |
| 3,272,061 | 9/1966 | Seckerson | 85—82 |
| 3,319,510 | 5/1967 | Rapata | 85—72 |

FOREIGN PATENTS

| | | |
|---|---|---|
| 973,648 | 9/1950 | France. |
| 1,306,092 | 9/1962 | France. |
| 855,285 | 11/1960 | Great Britain. |
| 976,418 | 11/1964 | Great Britain. |

MARION PARSONS, JR., *Primary Examiner.*